Jan. 12, 1960 E. N. MANNQVIST 2,920,719
LUBRICATING MEANS FOR TRAVERSERS AND THE LIKE
Filed Jan. 30, 1958 2 Sheets-Sheet 2
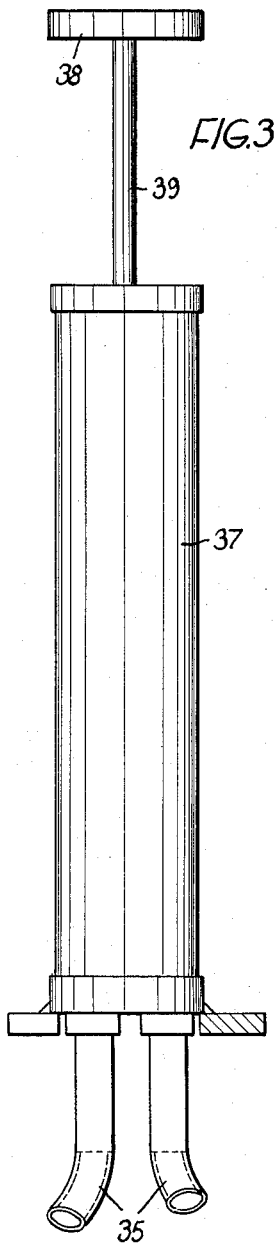
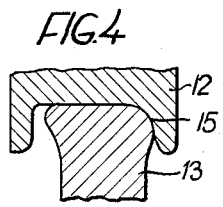
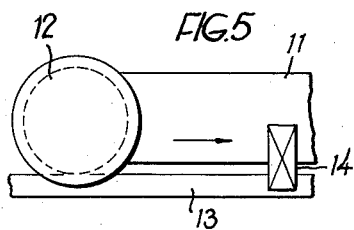
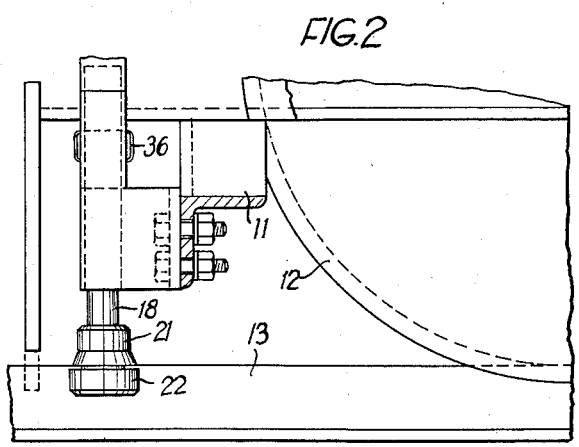

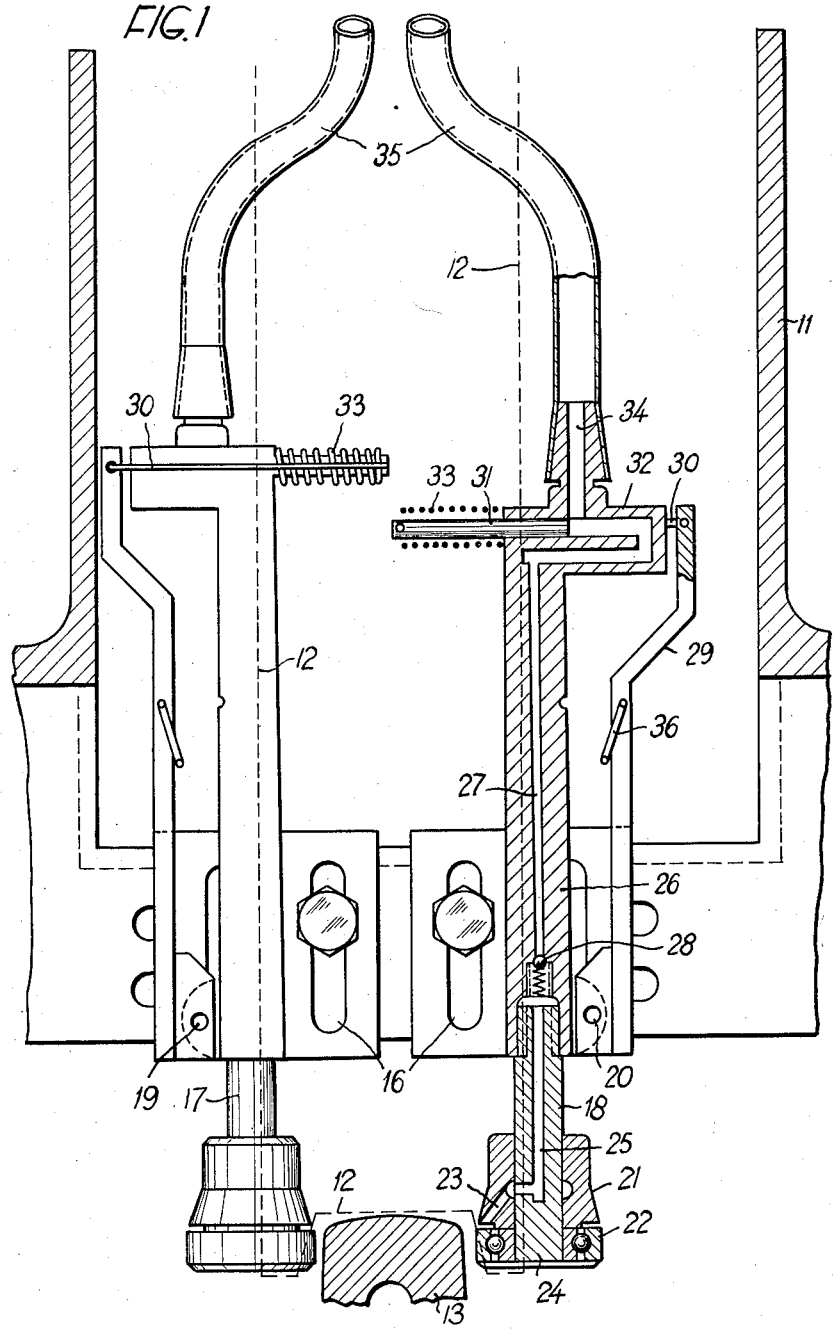

United States Patent Office 2,920,719
Patented Jan. 12, 1960

2,920,719

LUBRICATING MEANS FOR TRAVERSERS AND THE LIKE

Ernst Nils Mannqvist, Mackmyra, Sweden, assignor to Svenska Tecalemit Aktiebolaget, Stockholm, Sweden, a corporation of Sweden Application January 30, 1958, Serial No. 712,250

Claims priority, application Sweden February 4, 1957

5 Claims. (Cl. 184—3)

In traversers, telphers and similar mobile conveying members, an additional friction force often arises for various reasons, for instance in combination with a load and a consequential deflection of the axles of the travelling wheels of the traverser and so forth and with tilting of the latter, such additional friction showing up between said conveying members and the rail. The consequence of frequently recurring tiltings is a need for changes of the wheels and/or of the rails and for repairs of various kinds. Other causes of tilting are irregularities in the wheel track and/or the wheel flange or arising swaying or pitching movements at the removal of a load.

Means are known by which endeavours would be made to solve these drawbacks, said means generally taking the form of members for a continuous lubrication of the rails and/or the wheels, as a rule for liquid lubricating oils or the like. This involves, in addition to an unnecessary waste of lubricants, an unnecessary accumulation of lubricant on the rails with an accumulation of dust and dirt and thus also an increased risk of wear, dirtiness and so forth as a consequence thereto.

The present invention aims at solving these problems and relates to a lubricating means for traversers or similar mobile conveying members on rails or the like, said means being distinguished by the feature that one or more actuating members are secured directly or indirectly before and/or after one or more of the travelling wheels of the traverser, said actuating members being adapted, when contacting the rail, to be displaced and, when displaced, to apply a lubricating agent upon the rail. Hereby tiltings of the travelling wheel or wheels will bring about an application of lubricant at the frictional portion, which portion has otherwise proved relatively constant at a repeated passage of the car past said point. Thus only those points are subjected to lubrication where tilting of a travelling wheel and thus an additional friction force appears. By such an arrangement the wear of the travelling wheels on the rails is reduced to a minimum with considerably reduced maintenance costs in consequence thereto.

A more detailed formation of the inventive object in view is exemplified in an embodiment shown in the accompanying drawings. Among the accompanying drawings, Fig. 1 is a part sectional view of a lubricating contrivance according to the invention as viewed in the longitudinal direction of the rail, Fig. 2 showing the same arrangement, likewise partly in section, when viewed from the side, while Fig. 3 shows a lubricating container for the contrivance according to Figs. 1 and 2. Fig. 4 is a diagrammatic representation of a tilting travelling wheel on a rail, and Fig. 5 shows schematically a travelling wheel with a traverser framework and a lubricating device.

Fig. 5 shows diagrammatically the framework 11 of a traverser with a travelling wheel 12, said traverser being adapted to run on a pair of rails 13. If, for example, the traverser is taken to move with a load in the direction of the arrow, and by reason of a deflection of the travelling wheel axle or other members within the traverser swaying or pitching of the traverser carriage and so forth take place, tilting of one or more travelling wheel pairs 12 set in according to Fig. 4, the wheel flange, which is located opposite the direction of adjustment, will be brought into contact with the rail 13 at heavy friction so as to cause a consequential wear. If a lubricating contrivance 14 according to the invention is installed at the traverser before and/or after a travelling wheel, lubricating will be obtained at the frictional portion on the rail side 15 in the manner set forth hereinbelow, and it has proved that with a repeated operation of the traverser back and forth along the pair of rails, not in the least by reason of regularly repeated similar working conditions, the frictional points will recur at the same portions of the rail 13, for which reason a lubrication of these points involves a considerable saving of material and costs without any unnecessary consumption of lubricants, the above-named disadvantages resulting from deficient accuracy with respect to stiffness, adjustment, gauge of track of the traverser, the pairs of rails and so forth being thus obviated.

Figs. 1–3 show a form of embodiment according to the invention as arranged for instance according to 14 in Fig. 5. Arranged at the framework 11 of the traverser, either directly or via other members, is a lubricating contrivance according to the invention, said contrivance comprising securing members 16 for one or more pairs of actuating members 17, 18, which are movably arranged each about a turning point 19, 20 beside the framework 11, 16 and arranged as two-armed levers, the latter being not absolutely necessary, however, since it is obviously also possible to arrange the lever as a one-armed structure or to make the actuating member displaceable, entirely or in part, in the longitudinal direction thereof.

In the illustrated case, the actuating members are disposed in pairs on each side of a rail 13, before and/or after one or more of the travelling wheels 12 of the traverser carriage running on the rail.

The contact parts of the actuating members may be constructed in many different ways. In the example shown, the actual contact part is constructed as a ball bearing ring 22. The actuating member 22 may obviously be constructed in some other way, for instance with grooves, as a fiber ring and so forth. Arranged above the latter (as at 21) is a rigid or movable ring, said ring having bored into the same, or provided in some other manner, one or more lower lubricating passages 23, which opens or open at the ring 22. On the other hand, the ball bearing ring 22 may be fixedly or movably arranged at the central axle 24, if desired the lower central axle, of the actuating member 17, 18. Formed into said central axle is a lubricating passage 25 (or more of them), and this lower axle member may preferably be screwed onto an upper axle member 26, or may be made integral with this latter part. Formed into the upper part 26 (or into the entire axle 24–26) is a lubricating passage 27 (or more of them) communicating with a channel 25, the channel 27 leading from the other end, in this case the upper end of the actuating member. Preferably arranged in the lubricating passage is a non-return-valve 28 to prevent the passage of lubricant at non-operation. As will be seen, the actuating member 17, 18 is at the same time an applying member for lubricant, which is not necessary, however, but permits of being arranged separately within the scope of the invention. Certain parts of the actuating members (17, 18 and so forth) may be common to a plurality of such members.

Fixedly arranged at the framework 11 is, inter alia, an arm 29 for each actuating member, said arm having arranged thereon a strap or the like 30, at the other end of which is arranged a piston 31, or members connected to said piston, which piston is adapted at a displacement of the actuating member 17 or 18 to be moved into a cylinder 32. The insertion is adapted to be counteracted by a spring 33, and the cylinder 32 is connected to the lubricant passage 27—25 and to the passage 34 for the supply of lubricant, the upper part of which (the remote part) is preferably formed as a tube 35 or similar elastic member for the purpose of permitting the removal of the respective actuating member. A locking member 36 to arrest the actuating members may be arranged at the rigid arm 29 or in some other locality on the framework 11.

The tubes 35 extend to a lubricant container 37 (Fig. 3), in which is arranged a piston (not shown), which is resiliently actuated and/or adapted to be operated manually, for instance at 38. The lubricant may preferably be constituted by thick oil, thick oil plus grease, grease only, perhaps grease plus graphite and/or lubricant and so forth, preferably a non-viscous lubricant. If desired the piston rod 39 may be constructed as a measuring stick for the lubricant.

The arrangement functions as follows:

With tilting of the wheel 12 (in dashed lines in Fig. 1, and in full-drawn lines in Figs. 2 and 5) the contact ring 22, for example (located in the illustrated case approximately 5 millimetres nearer to the rail 13 than is the case for the travelling wheel 12), will be brought into contact with the rail 13 (see Fig. 1) and will be displaced to the right in the figure together with the lower part of the actuating member 18, for which reason the upper part at the cylinder 32 is displaced to the left by reason of the turning movement about the point 20. The cylinder 32 will then be pushed by the piston 31 against the resiliency of 33, lubricant being then projected through the passage 27 to open the non-return valve 28, and will continue through the passage 25 and the passages 23, perhaps via the applying member to the side of the rail to lubricate the latter at a reduced resistance rail-travelling wheel flange at this portion as a consequence thereto. When the contact between the actuating member ceases, the cylinder 32 will be returned to the right in the figure by resiliency at 33, the non-return valve 28 then closing and the application of lubricant ceasing. With tilting of the travelling wheel 12 to the right in Fig. 1, a corresponding procedure will take place for the actuating member 17, the left hand side of the rail being thus lubricated. Filling of lubricant may readily take place when required in the container 37 (Fig. 3).

It is of considerable importance that the contact ring be located nearer to the rail than the corresponding travelling wheel flange.

The above example of embodiment is chosen only arbitrarily and may be varied in a number of different ways within the scope of the invention, such as the latter is presented in the following claims. Obviously, the invention is also applicable to telphers beside the tracks of the same, in rail carriages of different kinds, even suspension vehicles, wire vehicles and so forth and is in no way restricted to the above-named field of use.

What I claim is:

1. In a combination with a wheeled carriage travelling on rail means, means for spot lubricating the rail means comprising at least one vertical actuating lever pivotally connected intermediate its ends to said carriage adjacent one of said wheels, the pivot axis of said actuating lever being substantially parallel to the axis of said rail means, said actuating lever having a lubricating passage extending longitudinally therethrough, a lubricant applying member secured to the actuating lever at that end thereof which is adjacent said rail, a lubricant supply means connected to the other end of said actuating lever, and pump means positioned in said lubricating passage and connected to said carriage for pumping lubricant through said passage when tilting of said wheel causes contact of the lubricant applying means with said rail to pivot said actuating lever relative to said carriage.

2. Rail lubricating means as defined in claim 1 wherein said pump means comprises a cylinder secured to said actuating lever and a piston member slidably movable in said cylinder and connected to said carriage.

3. Rail lubricating means as defined in claim 2 wherein said piston is arranged substantially normal to the longitudinal axis of said actuating lever, a portion of said piston extending partially from said cylinder, and further including strap means pivotally connecting the extending portion of said piston to said carriage.

4. Rail lubricating means as defined in claim 3 and further including compression spring means associated with the portion of said piston which extends from said cylinder, one end of said compression spring means being contiguous with said actuating lever and the other end of said compression spring means being contiguous with said strap means.

5. Apparatus as defined in claim 4 and further including a non-return valve positioned in said lubricating passage and arranged to open by pumping action of said pump means upon pivotal movement of said actuating lever relative to said carriage.

References Cited in the file of this patent

UNITED STATES PATENTS

| | | |
|---|---|---|
| 767,858 | York | Aug. 16, 1904 |
| 1,170,752 | Hodges | Feb. 8, 1916 |
| 1,311,505 | Franzen | July 29, 1919 |
| 1,497,177 | Long | June 10, 1924 |
| 1,707,183 | Agner | Mar. 26, 1929 |

FOREIGN PATENTS

| | | |
|---|---|---|
| 603,952 | Germany | Oct. 11, 1934 |
| 1,040,769 | France | May 27, 1953 |